United States Patent
Yoffe (10) Patent No.: US 11,552,702 B2
(45) Date of Patent: Jan. 10, 2023

(54) INTEGRATED COHERENT RECEIVER FOR DISTRIBUTED FIBER SENSING APPARATUS

(71) Applicant: Gideon Yoffe, Stanford, CA (US)

(72) Inventor: Gideon Yoffe, Stanford, CA (US)

(73) Assignee: Fiber Sense Limited, New South Wales (AU)

(*) Notice: Subject to any disclaimer, the term of this patent is extended or adjusted under 35 U.S.C. 154(b) by 0 days.

(21) Appl. No.: 17/243,379

(22) Filed: Apr. 28, 2021

(65) Prior Publication Data
US 2021/0336695 A1    Oct. 28, 2021

Related U.S. Application Data (60) Provisional application No. 63/016,926, filed on Apr. 28, 2020.

(51) Int. Cl.
*H04B 10/073*    (2013.01)
*H04B 10/61*    (2013.01)

(52) U.S. Cl.
CPC ......... *H04B 10/073* (2013.01); *H04B 10/614* (2013.01); *H04B 10/6162* (2013.01)

(58) Field of Classification Search
CPC . H04B 10/073; H04B 10/614; H04B 10/6162
USPC ..................................................... 398/9–33
See application file for complete search history.

(56) References Cited

U.S. PATENT DOCUMENTS

| | | | | |
|---|---|---|---|---|
| 6,263,128 B1* | 7/2001 | Huang | ............... | G02B 6/29352 385/24 |
| 7,379,633 B1* | 5/2008 | Ashley | .................. | G02B 6/138 385/14 |
| 7,724,991 B1* | 5/2010 | Doerr | .................. | G02B 6/12004 385/14 |
| 9,900,107 B1* | 2/2018 | Gao | ........................ | H04J 14/06 |
| 10,009,106 B2* | 6/2018 | Doerr | .................... | H04B 10/505 |
| 2010/0178065 A1* | 7/2010 | Nishihara | ............ | H04B 10/613 341/137 |
| 2010/0254718 A1* | 10/2010 | Oda | ........................ | H04B 10/60 398/202 |
| 2011/0216996 A1 | 9/2011 | Rogers | | |
| 2011/0243556 A1* | 10/2011 | Nagarajan | ............... | H04J 14/02 398/43 |
| 2011/0255077 A1 | 10/2011 | Rogers | | |
| 2012/0254718 A1* | 10/2012 | Nayar | .................... | G06Q 30/02 715/230 |
| 2013/0128907 A1 | 5/2013 | Hsieh | | |
| 2017/0019173 A1* | 1/2017 | Li | .......................... | H04B 10/61 |
| 2017/0237505 A1* | 8/2017 | Lucamarini | ........... | H04L 9/0858 398/185 |
| 2018/0062754 A1* | 3/2018 | Dupuis | .................... | G02F 1/225 |
| 2019/0196097 A1* | 6/2019 | Takechi | ................. | G02B 6/126 |

(Continued)

OTHER PUBLICATIONS

Claudio et al; Strain Wave Acquisition by a Fiberoptic Coherent Sensor for Impact Monitoring; Jul. 2017; MDPI; pp. 1-16. (Year: 2017).*

(Continued)

*Primary Examiner* — Amritbir K Sandhu
(74) *Attorney, Agent, or Firm* — KOS IP Law LLP (57) ABSTRACT

A distributed fiber sensing system may use an integrated coherent receiver. The integrated coherent receiver may include a planar lightwave circuit including various optical components.

14 Claims, 6 Drawing Sheets

(56) References Cited

U.S. PATENT DOCUMENTS

2019/0219441 A1    7/2019  Cedilnik
2019/0238178 A1*   8/2019  Huang ................. H04B 1/7136
2020/0081189 A1*   3/2020  Melloni .............. G02B 6/2861
2021/0041760 A1*   2/2021  Qiao ...................... G02F 1/225

OTHER PUBLICATIONS

Satoshi et al; Silica-based, compact and variable-optical attenuator integrated coherent receiver with stable optoelectronic coupling system; Nov. 2012; Optical Society of America; pp. 1-7. (Year: 2012).*
90° Optical Hybrid, http://www.optoplex.com/download/90deg%20Optical%20Hybrid_Rev2021.pdf; pp. 1-3.
Implementation Agreement for Integrated Dual Polarization Intradyne Coherent Receivers, IA # OIF-DPC-RX-01.2, Nov. 14, 2013, www.oiforum.com, pp. 1-25.

* cited by examiner

INTEGRATED COHERENT RECEIVER FOR DISTRIBUTED FIBER SENSING APPARATUS

CROSS REFERENCE TO RELATED APPLICATION

This application claims the benefit of the filing date of U.S. Provisional Patent Application No. 63/016,926, filed on Apr. 28, 2020, the disclosure of which is incorporated by reference herein.

FIELD OF THE INVENTION

The present invention relates generally to distributed fiber sensing, and more particularly to an integrated optical receiver for a distributed acoustic sensing (DAS) system.

BACKGROUND OF THE INVENTION

Optical distributed fiber sensing (DFS) systems have been used for several decades for the purpose of locating fiber faults or measuring temperature, strain, or vibration. DFS systems are distinguished from those using discrete sensors in that the fiber itself forms an array of sensors. The system relies on optical scattering within the fiber, which can be due to glass inhomogeneities (Rayleigh), acoustic waves (Brillouin) or optical phonons (Raman). In a typical system, light pulses are launched from one end of the fiber and reflected backscatter is received at the launch end. Time-of-flight measurements are used to determine where in the fiber a particular scattering event occurred, and analysis of the received signal is used to evaluate the measurand.

Detection of Rayleigh backscatter is commonly used for distributed vibration sensing (DVS), often known as distributed acoustic sensing (DAS). Any change in strain at a point along the optical fiber will cause a change in the optical path length and hence a change in the phase of the backscattered light.

Figure 1:
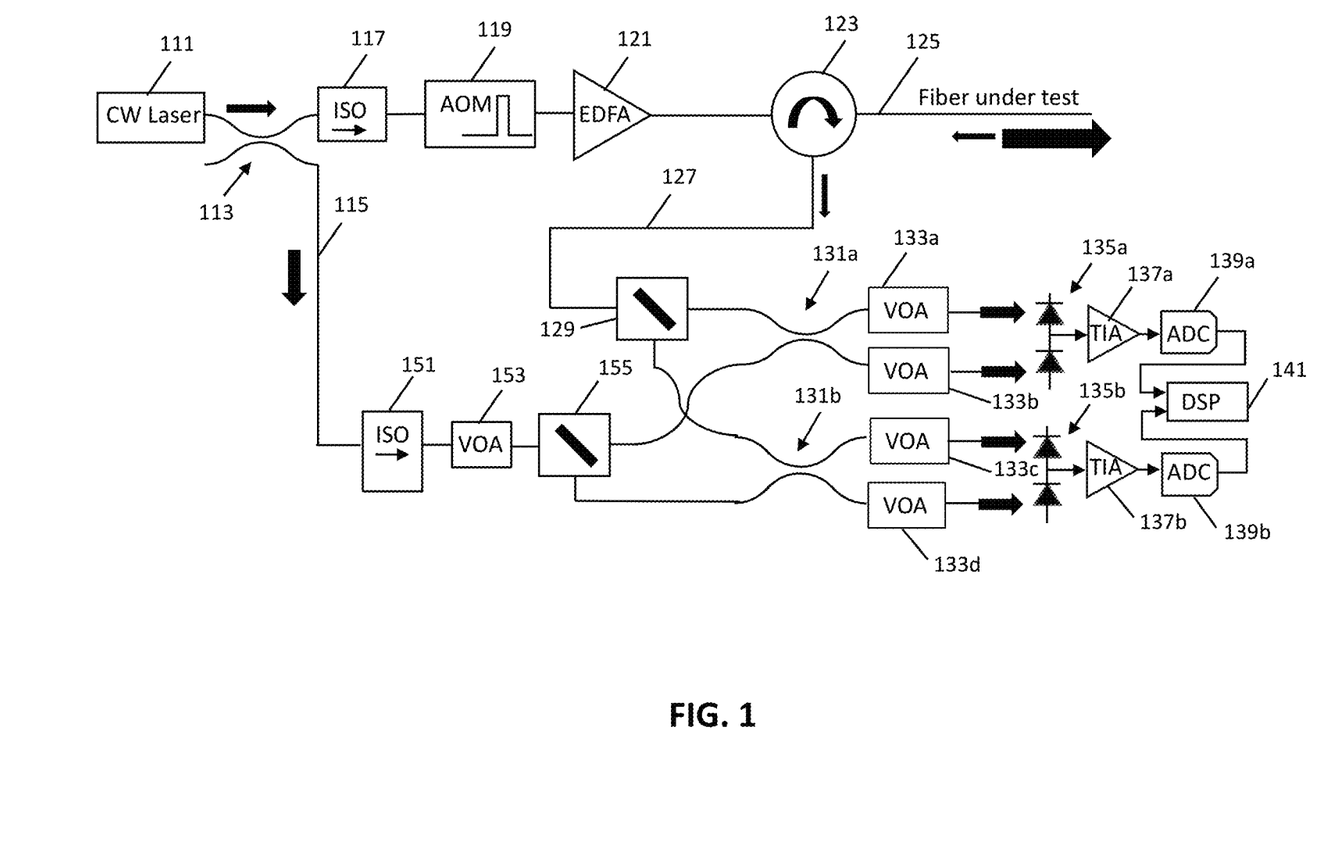
FIG. 1 is a schematic diagram of a typical phase-sensitive DAS system with a heterodyne coherent receiver.

A schematic diagram of a typical phase-sensitive DAS system with a heterodyne coherent receiver is shown in FIG. 1. Light from a continuous wave (CW) laser 111, serving as a source laser and typically operating in the telecommunications band near 1550 nm, is split into two paths, for example by a splitter 113. A first path passes through an optical isolator 117, and is formed into optical pulses, typically 10's to 100's of ns long, by an acousto-optic modulator (AOM) 119. The AOM also shifts the optical frequency of the light, typically by 80 to 300 MHz. The pulses are amplified by an Erbium-doped fiber amplifier (EDFA) 121 and launched into a fiber-under-test 125 via an optical circulator 123. The backscattered light from the fiber under test is directed by the circulator to a signal input of a coherent receiver. A second path 115 from the CW laser forms the local oscillator (LO) input to the coherent receiver. Light in the second path is passed through an optical isolator 151 and a variable optical attenuator 153. The polarization of the backscattered optical signal may well be different from that of the transmitted light, since the fiber-under-test may be several 10's of km in length, so polarization diversity is generally required in the receiver. The signal and LO light are split into paths for the two polarizations by polarization beam splitters 129 and 155, respectively, and mixed in 3 dB optical couplers 131$a,b$. The outputs of the couplers are passed through variable optical attenuators 133$a$-$d$, and are taken to balanced photodetectors 135$a,b$. Electrical outputs of the photodetectors are amplified by transimpedance amplifiers (TIAs) 137$a,b$, converted to digital signals by analog-to-digital converters (ADCs) 139$a,b$ and analysed by digital signal processors (DSP) 141. The optical frequencies of the signal and LO differ by the AOM frequency. The vibration frequencies of interest are in the range 0 to tens of kHz, so the full phase information in the signal can be measured electrically.

A DAS system is typically built into a 19-inch rack instrument, using packaged bulk optical components with connectorized optical fibers for inputs and outputs. Such systems have been deployed to monitor, for example, seismic events and intrusions or encroachment to oil pipelines and borders, applications that call for small numbers of units and that can tolerate high unit cost.

Figure 2:
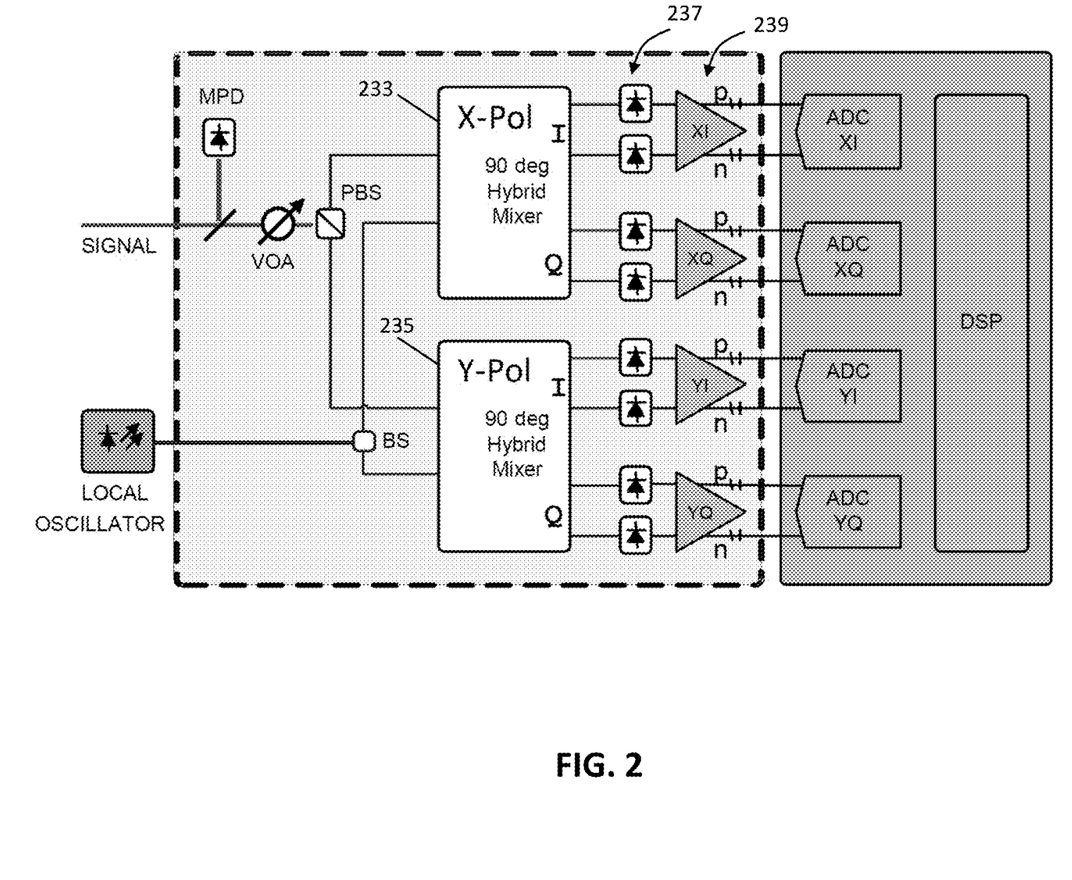
FIG. 2 is a schematic diagram of an agreed upon general implementation of an optical communication integrated coherent receiver.

Several manufacturers of optical communication transceivers supply integrated coherent receivers (ICRs). A schematic diagram of an agreed upon general implementation is shown in FIG. 2. The receiver of FIG. 2 is intradyne or homodyne, with the local oscillator at nominally the same wavelength as the signal. Dual polarizations are used deliberately, with separate data transmitted on the two polarizations. In order to extract the full phase information for an intradyne receiver, 90-degree hybrid mixers 233, 235 are used on each polarization, with four photodiodes 237 required per channel, and the receiver requiring four ADCs 241.

These integrated receivers are available in a variety of platforms, from fully-integrated on CMOS-compatible Silicon to hybrid assemblies on Silica.

Some of the characteristics of these optical communication receivers are not ideal. DFS systems, especially DAS, work with very small signals that exhibit a wide dynamic range and cover a relatively narrow frequency band at very low frequency compared to optical communication systems. The following design choices may therefore be different:

i) Optical loss is a major concern for DAS, and fully-integrated Silicon-based ICR's are generally not good enough;

ii) The TIA's should be optimized for low noise at sub-GHz frequency, rather than broadband operation;

iii) Because of the wide dynamic range of the received DAS signal, the ADC's preferably have high resolution and low noise. These components are expensive, so it is a clear disadvantage to require four ADC's and associated signal processing in the intradyne receiver.

BRIEF SUMMARY OF THE INVENTION

Some embodiments provide an integrated heterodyne coherent optical receiver for DAS systems, and/or other sensing systems in some embodiments. One potential advantage over intradyne telecom integrated receivers is that two expensive ADC's are used rather than four, with associated reduction in signal processing. Some embodiments make use of thermo-optic tuning of a Mach-Zehnder interferometer as the variable optical attenuator (VOA) in the silicon platform, for example in order to reduce noise compared to a device that relies on free-carrier absorption via current injection. In some embodiments the Mach-Zehnder interferometer includes a designed imbalance, so that only one thermal phase shifter is used or required, and both the number of electrical connections and the maximum power consumption can be reduced. This also applies for other forms of phase shifters in various embodiments. In some embodiments the polarization splitting of a signal from a fiber-under-test is performed by an external optical component, with separate optical signal inputs on the PLC for the two different signals. In some embodiments optical signals from the external polarization splitter and the local oscillator coupled to waveguides on the PLC are in the same polarization state.

Some embodiments provide a coherent receiver for a distributed fiber sensing system, in which a continuous wave laser generates light for propagation down a fiber, with backscattered light provided by a circulator to the coherent receiver, the coherent receiver comprising: a first polarization beam splitter for splitting a backscattered optical signal from a fiber-under-test into a first polarization input signal and a second polarization input signal; a first variable optical attenuator for controlling amplitude of a local oscillator (LO) signal, the first variable optical attenuator being on a planar lightwave circuit (PLC); a second polarization beam splitter for splitting the controlled amplitude local oscillator signal into a first polarization LO signal and a second polarization LO signal, the second polarization beam splitter being on the PLC; a first mixer for mixing the first polarization input signal and the first polarization LO signal, the first mixer being on the PLC; a second mixer for mixing the second polarization input signal and the second polarization LO signal, the second mixer being on the PLC; a first pair of variable optical attenuators (VOAs) for equalizing signals from the first mixer, the first pair of VOAs being on the PLC; a second pair of VOAs for equalizing signals from the second mixer, the second pair of VOAs being on the PLC; a first pair of balanced photodiodes for converting light from the first pair of VOAs to a first electrical signal; and a second pair of balanced photodiodes for converting light from the second pair of VOAs to a second electrical signal.

In some embodiments the first pair of balanced photodiodes and the second pair of balanced photodiodes are mounted to the PLC.

In some embodiments the first polarization beam splitter is on the PLC.

In some embodiments the first polarization beam splitter is external to the PLC.

In some embodiments each VOA of the first pair of VOAs and the second pair of VOAs comprise a Mach-Zehnder interferometer with at least one phase shifter. In some such embodiments the phase shifter comprises a thermal phase shifter. In some such embodiments each arm of each Mach-Zehnder interferometer includes a phase shifter. In some such embodiments only one arm of each Mach-Zehnder interferometer includes a phase shifter. In some such embodiments each Mach-Zehnder interferometer includes a first arm and a second arm, and the first arm and the second arm are of unequal lengths. In some such embodiments the first mixer and the second mixer are part of the Mach-Zehnder interferometers.

In some embodiments the first mixer and the second mixer comprise 3 dB couplers.

Some embodiments provide method of performing distributed fiber sensing, comprising: generating light from a continuous wave laser; forming optical pulses using the light from the continuous wave laser; providing the optical pulses to a fiber-under-test; receiving back scattered light from the fiber-under-test; providing the back scattered light as a signal input to a coherent receiver; and providing the light from the continuous wave laser as a local oscillator input to the coherent receiver; the coherent receiver including a planar lightwave circuit (PLC) having optical signal paths for separately operating on the signal input and the local oscillator input in a first polarization state and a second polarization state, the operations including mixing of the signal input and the local oscillator signal in the first polarization state, mixing of the signal input and the local oscillator signal in the second polarization state, and equalizing the mixed signals.

In some embodiments the signal input to the coherent receiver is the back scattered light passed through a polarization beam splitter external to the PLC. In some such embodiments the signal input to the coherent receiver and the local oscillator input to the coherent receiver are in a same polarization state.

In some embodiments the operation of equalizing the mixed signals is performed using Mach-Zehnder interferometers with a phase shifter. In some such embodiments the phase shifter is a thermal phase shifter. In some such embodiments the Mach-Zehnder interferometers are provided with arms of unequal length.

Some embodiments provide a coherent receiver for a distributed fiber sensing system, in which a continuous wave laser generates light for propagation down a fiber, with backscattered light provided by a circulator to the coherent receiver, the coherent receiver comprising: a first polarization beam splitter for splitting a backscattered optical signal from a fiber-under-test into a first polarization input signal and a second polarization input signal; a beam splitter for splitting a local oscillator (LO) signal into a first LO signal and a second LO signal, the beam splitter being on a PLC; a first mixer for mixing the first polarization input signal and the first LO signal for generating a first pair of mixed signals, the first mixer being on the PLC; a second mixer for mixing the second polarization input signal and the second LO signal for generating a second pair of mixed signals, the second mixer being on the PLC; a first pair of balanced photodiodes for converting light of the first pair of mixed signals to a first electrical signal; and a second pair of balanced photodiodes for converting light of the second pair of mixed to a second electrical signal.

In some embodiments the first pair of balanced photodiodes and the second pair of balanced photodiodes are mounted to the PLC.

In some embodiments the first polarization beam splitter is on the PLC.

In some embodiments the first polarization beam splitter is external to the PLC.

Some embodiments further comprise: a first pair of variable optical attenuators (VOAs) for equalizing the first pair of signals from the first mixer, the first pair of VOAs being on the PLC, the first pair of VOAs being between the first mixer and the first pair of balanced photodiodes in an optical path of the first pair of signals from the first mixer; and a second pair of VOAs for equalizing the second pair of signals from the second mixer, the second pair of VOAs being on the PLC, the second pair of VOAs being between the second mixer and the second pair of balanced photodiodes in an optical path of the second pair of signals from the second mixer. In some embodiments each VOA of the first pair of VOAs and the second pair of VOAs comprise a Mach-Zehnder interferometer with at least one phase shifter. In some such embodiments the phase shifter comprises a thermal phase shifter. In some such embodiments each arm of each Mach-Zehnder interferometer includes a phase shifter. In some such embodiments only one arm of each Mach-Zehnder interferometer includes a phase shifter. In some such embodiments each Mach-Zehnder interferometer includes a first arm and a second arm, and the first arm and the second arm are of unequal lengths. In some such embodiments the first mixer and the second mixer are part of the Mach-Zehnder interferometers.

In some embodiments the first mixer and the second mixer comprise 3 dB couplers.

Some embodiments further comprise a first optical attenuator for attenuating amplitude of the local oscillator (LO) signal for presentation to the splitter, the first optical attenuator being on the planar lightwave circuit (PLC). In some such embodiments the first optical attenuator comprises a variable optical attenuator. In some such embodiments the first optical attenuator comprises a fixed optical attenuator.

In some embodiments the beam splitter is a polarization beam splitter.

These and other aspects of the invention are more fully comprehended upon review of this disclosure.

DETAILED DESCRIPTION

Figure 3:
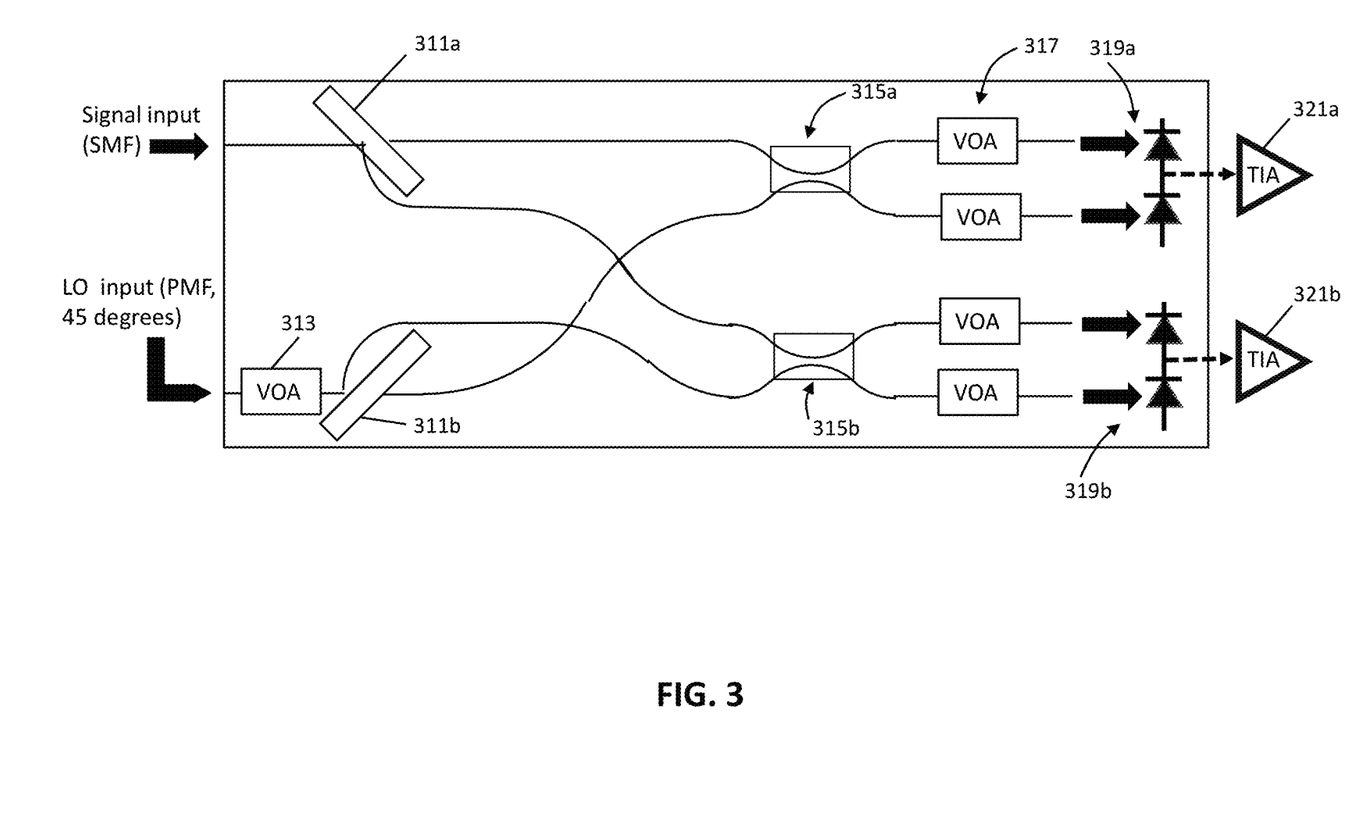
FIG. 3 is a semi-schematic diagram of an example integrated coherent receiver for a distributed fiber sensing system, in accordance with aspects of the invention.

This disclosure discusses an integrated heterodyne optical receiver for a DFS system, a DAS system in some embodiments. In some embodiments the optical receiver provides the same or similar functionality as the optical receivers currently built into distributed fiber sensing systems. A schematic diagram of an example optical receiver is shown in FIG. 3. The general functionality is generally the same as was discussed with respect to FIG. 1.

In some embodiments the optical system is built on a planar lightwave circuit (PLC) platform, which can be fabricated in several different materials including Silicon, Silica, Silicon Nitride, and Indium Phosphide. The circuit contains functional elements, such as 3 dB couplers and polarization beam splitters, and optical waveguides as interconnections.

An input source signal, formed of the backscattered light from a fiber-under-test, is split into two polarization paths by a polarization beam splitter (PBS) 311a and directed to two 3 dB couplers 315a,b. In some embodiments the PBS may be a PBS/rotator, with the PBS/rotator also performing a rotation of at least one of the polarizations. The rotation of polarization may result in optical signals on the polarization paths having the same polarization, for example a TE polarization with an electric field in a plane defined by the PLC.

A local oscillator (LO) signal, tapped from the source laser in some embodiments (for example as discussed with respect to FIG. 1), is first controlled in amplitude by a variable optical attenuator (VOA) 313 and then split into two polarization paths by a PBS 311b, for mixing with the polarized source signal by the 3 dB couplers. In some embodiments the VOA is optional, and may be omitted in some embodiments, for example depending on quality of the splitter 113 of FIG. 1, from which the LO signal may be pulled. In some embodiments, for example embodiments, in which a PBS/rotator is used for the input source signal, the PBS 311b may instead be an optical splitter. In some embodiments the LO signal is brought to the receiver using polarization maintaining fiber (PMF), which is coupled to the receiver in such a way that similar amounts of light are coupled into two polarization states, for example in some embodiments with the PMF polarization axis at 45 degrees to the plane of the PLC. In some implementations an optical amplifier, either an EDFA or a semiconductor optical amplifier (SOA), is inserted into the LO path in place of or in addition to the VOA.

The outputs of the two 3 dB couplers, which are used as mixers, are taken to photodiodes 319a,b in a balanced configuration. VOAs 317 are used to equalize the signals on the two photodetectors on each path in order to minimize the component of the output current that is due to the self-mixing of the local oscillator alone, compensating for slight deviation from equal splitting in the 3 dB coupler. This procedure, the use of the VOAs 317, is standard for balanced receivers. In some embodiments, for example if the component of output current due to self-mixing of the LO signal may be sufficiently insignificant, the VOAs may be omitted. The electrical outputs of the photodiodes are taken to TIAs 321a,b, which are separate chips in some embodiments.

In some platforms, for example Silicon and Indium Phosphide, all of the components can be integrated monolithically. In others, for example Silica and Silicon nitride, some of the components, especially the photodiodes, are generally made separately. These components are sometimes attached directly to the PLC, with appropriate optical coupling functionality built into the PLC, or they can be mounted close to the PLC with light coupled through free space or lenses.

The VOA functionality can be achieved in different ways in various embodiments.

In Silicon, the VOA is typically a waveguide that includes a p-n diode junction in the optical path. Forward bias of the diode causes injection of electrons and holes into the junction, which increases optical loss through free-carrier absorption. Reverse bias removes electrons and holes from the junction, which decreases the absorption loss.

Figure 4:
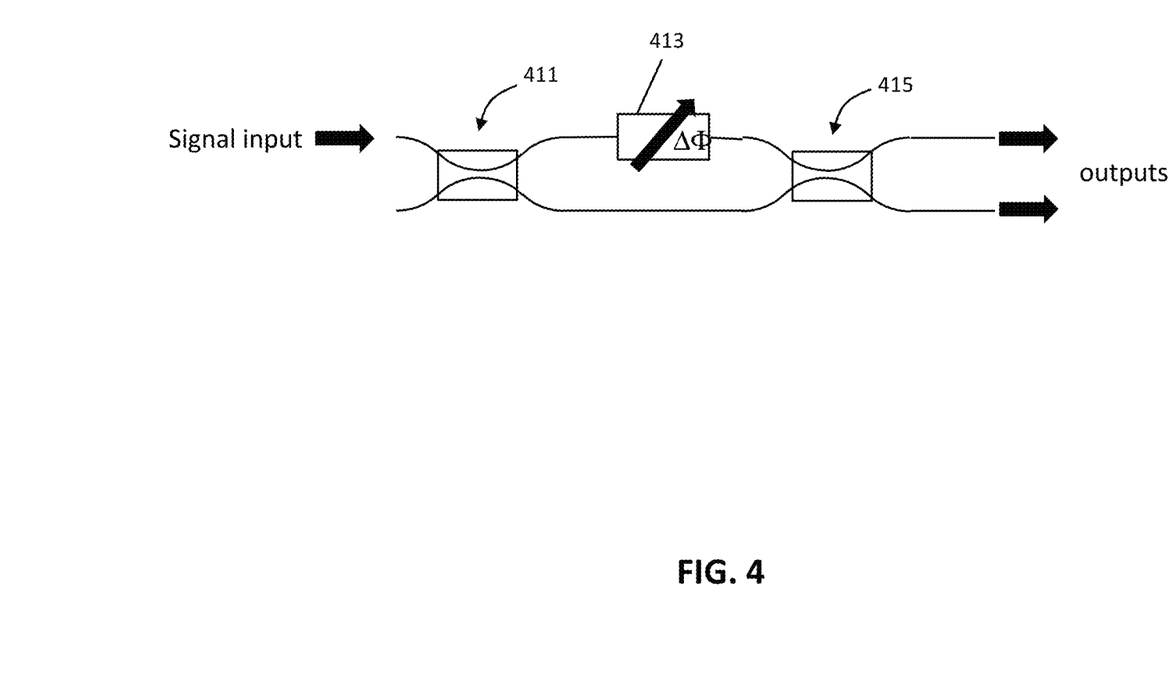
FIG. 4 is a semi-schematic diagram of a variable optical attenuator based on a Mach-Zehnder interferometer with a thermo-optic phase shifter.

On passive platforms such as Silicon Nitride or Silica, the VOA is typically fabricated as a Mach-Zehnder interferometer, with a thermo-optic phase shifter in at least one of the branches. A semi-schematic diagram of a Mach-Zehnder interferometer with a thermo-optic phase shifter is shown in FIG. 4. In FIG. 4, a 3 dB coupler 411 splits an input optical signal into a first arm and a second arm, with a second 3 dB coupler 415 coupling ends of the arms and providing two outputs. An integrated electrical heater 413 in one arm, the first arm in FIG. 4, provides a variable phase shift through the thermo-optic effect. The variable phase shift changes the proportion of light that couples to each output. If only one output is desired, the other output is terminated in a way to avoid back-reflections. For convenience, in some embodiments heaters can be provided on both arms of the interferometer. In this way the required thermal power can be minimized by selection of the arm that requires the smaller phase shift in order to achieve the desired tuning.

If it is desirable to incorporate only one phase shifter, for example in embodiments with Mach-Zehnder interferometers, in some embodiments the splitting ratios of one or both of the 3 dB couplers can be designed to be something other than 50:50, or in some embodiments the interferometer arms can be made with slightly unequal optical lengths. In this way it can be determined by design that one arm will require a small positive phase shift in order to achieve the desired range of optical loss, despite possible manufacturing variations, and then only that arm requires a phase shifter. In this way the number of electrical connections to the PLC can be reduced at the same time as minimizing the maximum power requirement.

Even in Silicon it may be preferable to use thermal VOA devices rather than current-injection devices in DAS receivers. Current injection is inherently a noisy process, and the attenuation will be accompanied by undesirable phase noise that will degrade the received signal. The reverse-bias mode of operation is less efficient than forward bias but gives the advantage of generating less noise.

For some embodiments, an alternative to electrical or thermal tuning is to use an electro-mechanical tuning element, for example a piezo-electric element, that can provide an optical phase shift through a combination of changes in the physical length and the refractive index of the waveguide material.

Figure 5:
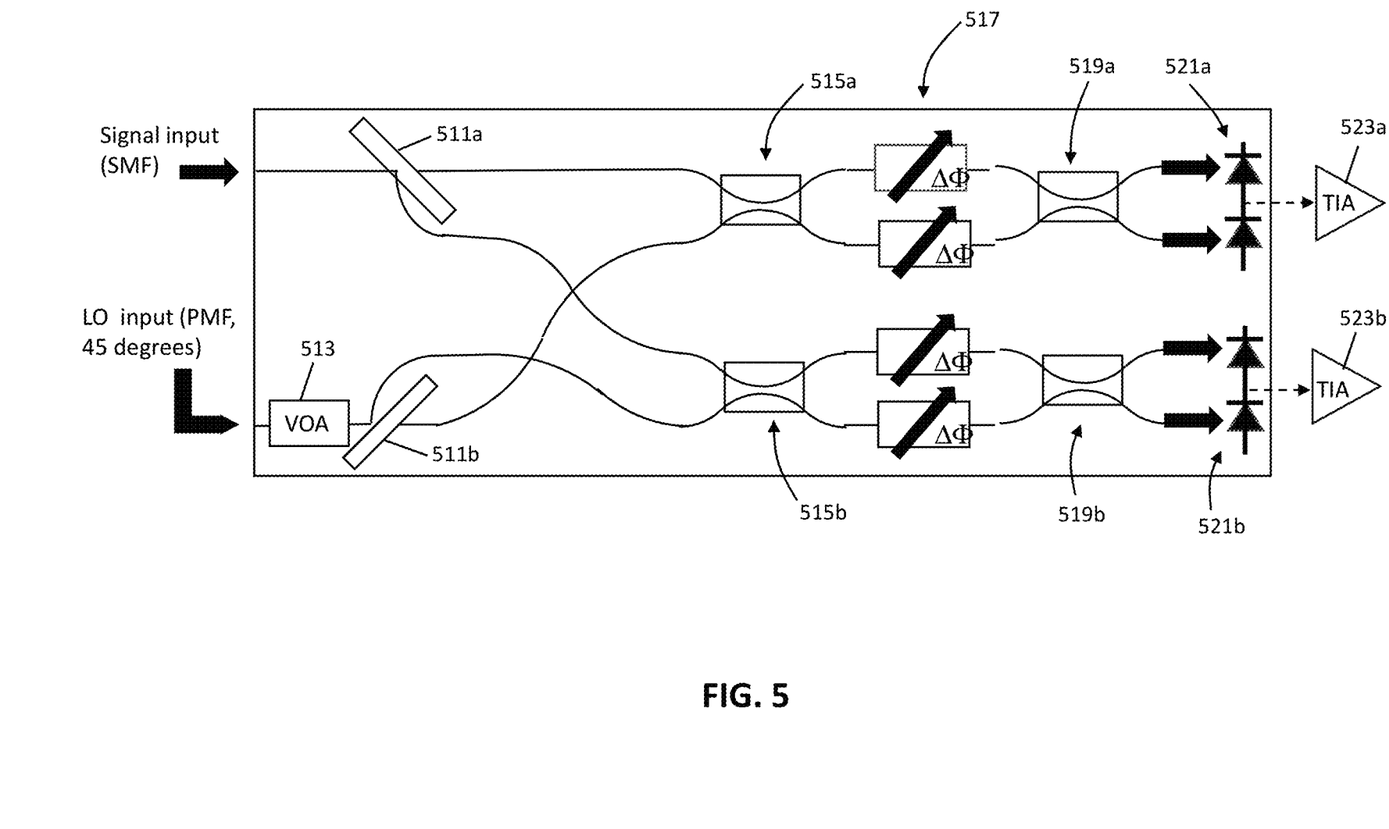
FIG. 5 is a semi-schematic diagram of a further example integrated coherent receiver with an alternative mixing stage, in accordance with aspects of the invention.

An example alternative mixing stage of the receiver is shown in FIG. 5. In FIG. 5, the input signal and the LO signal are provided to 3 dB couplers as discussed with respect to FIG. 3. For example, the input signal, formed of the backscattered light from a fiber-under-test, may be split into two polarization paths by a polarization beam splitter (PBS) 511a and directed to two 3 dB couplers 515a,b. Somewhat similarly, the LO may first be controlled in amplitude by a variable optical attenuator (VOA) 513 and then split into two polarization paths by a PBS 511b, for mixing with the polarized source signal by the 3 dB couplers. The 3 dB couplers, however, are part of Mach-Zehnder interferometers comprised of the 3 dB couplers 515a,b, variable phase shifters 517, and second 3 dB couplers 519a,b. The mixing and balancing functions are integrated into the Mach-Zehnder interferometers, with the variable phase shifter 517 in at least one of the arms of each Mach-Zehnder interferometer. As before, this phase shifter can use thermal, electrical, or electro-mechanical elements to tune the phase. This design may have a number of advantages compared to the use of separate VOAs:

i. It is more compact, especially if Mach-Zehnder interferometers are used as VOAs;
ii. This arrangement achieves balance of both self-mixing products, LO*LO and signal*signal, simultaneously, which is generally not possible using separate VOAs.
iii. The balance is achieved using a phase shift rather than attenuation, so the optical loss through the output stage is minimized.
iv. FIG. 5 illustrates the case in which a phase shifter is incorporated in both arms of the interferometer. In some embodiments it is sufficient to have a tunable phase shifter in one arm only. In many cases, for example to achieve optimal signal balance, a small phase shift would be performed in one arm but a larger shift would be performed in the other, because only one direction of phase shift is available. For example, a heater can generally only cause a positive change of refractive index and hence a positive phase shift. Since the phase shift is generally used to correct a small imbalance caused in manufacture it may be difficult to predict which arm would require a positive phase shift, so it is convenient to incorporate a phase shifter in both arms.
v. If it is desirable to incorporate only one phase shifter as described in iv. above, the splitting ratios of one or both of the 3 dB couplers can be designed to be something other than 50:50, or the interferometer arms can be made with slightly unequal optical lengths. In this way it can be determined by design that one arm will require a positive phase shift, despite possible manufacturing variations, and then only that arm has a phase shifter, although phase shifters may be provided for both arms in some embodiments. In this way the number of electrical connections to the PLC can be reduced at the same time as minimizing the maximum power requirement.

Figure 6:
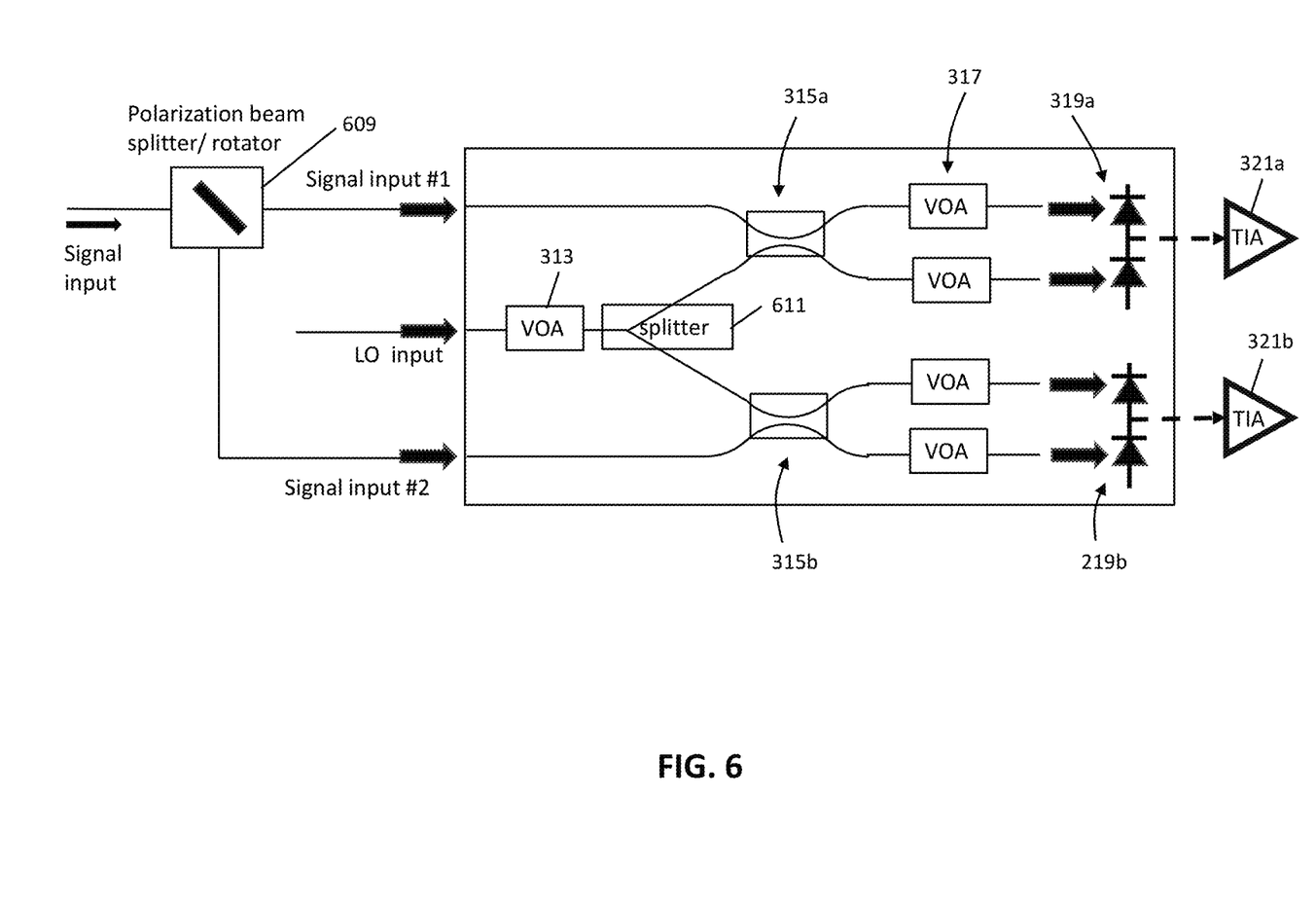
FIG. 6 is a semi-schematic of an integrated coherent receiver with an external polarization splitter, in accordance with aspects of the invention.

In some embodiments it is preferable to perform the polarization splitting function using a separate optical component external to the integrated receiver PLC. Sometimes better performance with regard to polarization splitting and optical loss can be obtained in this way. An example of such an arrangement is shown in FIG. 6, which is a semi-schematic of an integrated coherent receiver with an external polarization splitter 609. The general receiver layout of FIG. 3 is employed, with, however, an input signal split by the external PBS 609 and input to a PLC. On the PLC, the split input signal is directed towards two 3 dB couplers 315a,b. An LO signal is input to the PLC, in some embodiments controlled in amplitude by an optional variable optical attenuator (VOA) 313, and then split into two paths by a splitter 611, for mixing with the polarized source signal by the 3 dB couplers. As in the embodiment of FIG. 3, outputs of the two 3 dB couplers, which are used as mixers, are taken to photodiodes 319a,b in a balanced configuration, with VOAs 317, optional in some embodiments, used to equalize the signals on the two photodetectors on each path. The electrical outputs of the photodiodes are taken to TIAs 321a,b. In some embodiments the alternative layout discussed with respect to FIG. 5 may instead be employed, with the alternative mixing stage implemented.

The external polarization splitter separates the signal into the two polarization states, which are coupled to separate input waveguides on the PLC. The LO signal is coupled in on one single waveguide. It is most convenient to arrange that the two signal inputs and the LO are coupled onto the PLC in the same polarization state, using polarization maintaining optical fiber on each input. In this way the LO signal can be split between the two channels without the need for polarization rotation. Also, as the LO signal is carried by the polarization maintaining optical fiber, and does not experience signal degradation to the extent experienced by signals from the fiber-under-test, use of an internal beam splitter, as opposed to use of an external PBS or even internal PBS, is sufficient in many embodiments. In some embodiments, however, an external PBS or an internal (to the PLC) PBS may be used.

Although the invention has been discussed with respect to various embodiments, it should be recognized that the invention comprises the novel and non-obvious claims supported by this disclosure.

The invention claimed is:

1. A coherent receiver for a distributed fiber sensing system, in which a continuous wave laser generates light for propagation down a fiber, with backscattered light provided by a circulator to the coherent receiver, the coherent receiver comprising:
 a first polarization beam splitter for splitting a backscattered optical signal from a fiber-under-test into a first polarization input signal and a second polarization input signal;
 a beam splitter for splitting a local oscillator (LO) signal into a first LO signal and a second LO signal, the beam splitter being on a planar lightwave circuit (PLC);

a first mixer for mixing the first polarization input signal and the first LO signal for generating a first pair of mixed signals, the first mixer being on the PLC;

a second mixer for mixing the second polarization input signal and the second LO signal for generating a second pair of mixed signals, the second mixer being on the PLC;

a first pair of balanced photodiodes for converting light of the first pair of mixed signals to a first electrical signal;

a second pair of balanced photodiodes for converting light of the second pair of mixed to a second electrical signal;

a first pair of variable optical attenuators (VOAs) for equalizing the first pair of mixed signals from the first mixer, the first pair of VOAs being on the PLC, the first pair of VOAs being between the first mixer and the first pair of balanced photodiodes in an optical path of the first pair of mixed signals from the first mixer;

a second pair of VOAs for equalizing the second pair of mixed signals from the second mixer, the second pair of VOAs being on the PLC, the second pair of VOAs being between the second mixer and the second pair of balanced photodiodes in an optical path of the second pair of mixed signals from the second mixer; and a first optical attenuator for attenuating amplitude of the local oscillator (LO) signal for presentation to the beam splitter, the first optical attenuator being on the PLC.

2. The coherent receiver of claim 1, wherein the first pair of balanced photodiodes and the second pair of balanced photodiodes are mounted to the PLC.

3. The coherent receiver of claim 1, wherein the first polarization beam splitter is on the PLC.

4. The coherent receiver of claim 1, wherein the first polarization beam splitter is external to the PLC.

5. The coherent receiver of claim 1, wherein each VOA of the first pair of VOAs and the second pair of VOAs comprise a Mach-Zehnder interferometer with at least one phase shifter.

6. The coherent receiver of claim 5, wherein the phase shifter comprises a thermal phase shifter.

7. The coherent receiver of claim 6, wherein each arm of each Mach-Zehnder interferometer includes a phase shifter.

8. The coherent receiver of claim 6, wherein only one arm of each Mach-Zehnder interferometer includes a phase shifter.

9. The coherent receiver of claim 8, wherein each Mach-Zehnder interferometer includes a first arm and a second arm, and the first arm and the second arm are of unequal lengths.

10. The coherent receiver of claim 5, wherein the first mixer and the second mixer are part of the Mach-Zehnder interferometers.

11. The coherent receiver of claim 1, wherein the first mixer and the second mixer comprise 3 dB couplers.

12. The coherent receiver of claim 1, wherein the first optical attenuator comprises a variable optical attenuator.

13. The coherent receiver of claim 1, wherein the first optical attenuator comprises a fixed optical attenuator.

14. The coherent receiver of claim 1, wherein the beam splitter is a polarization beam splitter.

* * * * *